United States Patent
Brown et al.

(10) Patent No.: US 12,079,687 B2
(45) Date of Patent: Sep. 3, 2024

(54) DISCRETE FREQUENCY MODULATED GATES FOR CONDITIONAL LOGIC IN TRAPPED ION QUANTUM COMPUTERS

(71) Applicant: Duke University, Durham, NC (US)

(72) Inventors: Kenneth R. Brown, Durham, NC (US); Pak Hong Leung, Durham, NC (US); Shilin Huang, Durham, NC (US); Bichen Zhang, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 833 days.

(21) Appl. No.: 17/212,678

(22) Filed: Mar. 25, 2021

(65) Prior Publication Data

US 2021/0304051 A1 Sep. 30, 2021

Related U.S. Application Data

(60) Provisional application No. 62/994,998, filed on Mar. 26, 2020.

(51) Int. Cl.
| | |
|---|---|
| *G06N 10/00* | (2022.01) |
| *B82Y 10/00* | (2011.01) |
| *G02F 3/02* | (2006.01) |

(52) U.S. Cl.
CPC .............. *G06N 10/00* (2019.01); *B82Y 10/00* (2013.01); *G02F 3/026* (2013.01)

(58) Field of Classification Search
CPC .......... G06N 10/00; B82Y 10/00; G02F 3/026
See application file for complete search history.

(56) References Cited

U.S. PATENT DOCUMENTS

| | | | |
|---|---|---|---|
| 2018/0330267 A1 | 11/2018 | Rigetti et al. | |
| 2019/0205784 A1* | 7/2019 | Monroe | G06N 10/00 |
| 2020/0082291 A1* | 3/2020 | Debnath | G02F 1/113 |

OTHER PUBLICATIONS

Leung PH, Brown KR. Entangling an arbitrary pair of qubits in a long ion crystal. Physical Review A. Sep. 18, 2018;98(3):032318. (Year: 2018).*
Leung PH, Landsman KA, Figgatt C, Linke NM, Monroe C, Brown KR. Robust 2-qubit gates in a linear ion crystal using a frequency-modulated driving force. Physical review letters. Jan. 9, 2018;120(2):020501. (Year: 2018).*
Alistair R. Milne, Phase-modulated entangling gates robust to static and time-varying errors, Oct. 30, 2018.
International Search Report and Written Opinion issued in PCT Patent Application PCT/US2021/024391 on Jan. 5, 2022.

(Continued)

*Primary Examiner* — Chuen-Meei Gan
(74) *Attorney, Agent, or Firm* — Kaplan Breyer Schwarz LLP

(57) ABSTRACT

A system includes a controller configured to reconstitute a continuous waveform to a discrete analogue version. The system includes a numerical optimizer configured to determine frequencies of a pulse sequence. The numerical optimizer uses radial motional mode frequencies and a desired gate time. The numerical optimizer generates the pulse sequence by closing phase-space trajectories, disentangling spins and motions, and constraining a Rabi frequency for motional sideband transitions. The system also includes a display configured to illustrate a discrete frequency modulation pulse sequence based on the determined frequencies.

17 Claims, 11 Drawing Sheets

(56) References Cited

OTHER PUBLICATIONS

Pak Hong Leng, Robust two-qubit gates in a linear ion crystal using a frequency-modulated driving force, Aug. 27, 2017.
Du Yuanbo et al, Note: A high-frequency |6 signal generator based on direct digital synthesizer and field-programmable gate array, Sep. 1, 2014, Review of Scientific Instruments, American Institute of Physics, 2 Huntington Quadrangle, Melville, NY 11747, vol. 88, No. 9.
Supplementary Search Report with written opinion issued on Mar. 26, 2024 in EP Patent Application No. 21814100.0.
Wang Ye et al, High-Fidelity Two-Qubit Gates Using a Microelectromechanical-System-Based Beam Steering System for Individual Qubit Addressing, Oct. 6, 2020, Physical Review Letters.

* cited by examiner

DISCRETE FREQUENCY MODULATED GATES FOR CONDITIONAL LOGIC IN TRAPPED ION QUANTUM COMPUTERS

CROSS REFERENCE TO RELATED APPLICATIONS

This application claims the benefit of U.S. Provisional Application Ser. No. 62/994,998 filed Mar. 26, 2020, entitled "Discrete Frequency Modulated Gates For Conditional Logic In Trapped Ion Quantum Computers", which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This disclosure was made with Government support under Federal Grant No. Phy-181891 awarded by the National Science Foundation. The Federal Government has certain rights to this disclosure.

FIELD OF THE TECHNOLOGY

The present disclosure relates to discrete frequency modulated gates in quantum computers. More particularly, the present disclosure relates producing a discrete frequency modulation pulse sequence given measured radial motional mode frequencies and a desired gate time.

BACKGROUND

Due to long coherence times, high-fidelity initialization, detection, and qubit gate operation, trapped atomic ions are a leading qubit platform for the realization of a quantum computer. A Molmer-Sorensen (MS) gate is a two-qubit gate with demonstrated fidelities above 99.9% in a two-ion system that uses axial modes.

In a two-ion chain or four-ion chain, individual optical addressing of the ions and modulated pulse techniques are crucial for the MS gate. Multi-channel acousto-optic modulations have been used for the individual addressing of atomic qubits. In addition, steering beams using acousto/electro-optic modulations and micro-electromechanical system (MEMS) tilting mirrors have also been used to individually address the atomic qubits.

With regard to the MEMS individually addressing qubit system, negligible crosstalk has been demonstrated. In addition, gate schemes that are not sensitive to optical phase drift between addressing beams have also been developed. Moreover, phase drift can occur that cause entanglement of spins and motions of motional modes. The phase drift can also lead to a deviation of a rotation angle of the gate.

Other methods that have been used include amplitude-modulated (AM) gates, frequency-modulated (FM) gates, and multitone MS gates. In addition, the fidelity has been demonstrated in such AM, FM, and MS gates. Using ion chains of five or more ions, the fidelity has been demonstrated to be typically around 97% to 98.5%. As such, these modulated pulse attempts to increase robustness of the gates against any occurring frequency drifts have taken place.

For any type of high-fidelity quantum logic gate operations in a larger array of qubits, the poor optical coherence has to be considered. The poor optical coherence between individual addressing beams can have a definite impact on the gate fidelity. Another factor that can affect the gate fidelity is the crosstalk from an addressing beam to neighboring qubits. Both factors can have a definite impact on the gate fidelity, and methods described above have had to deal with the poor phase coherence and the crosstalk between an addressing beam and neighboring qubits.

With regard to the crosstalk, systems have demonstrated the negligible crosstalk between the addressing beam and neighboring qubits. For instance, the MEMS addressing system and gate schemes that are not sensitive to optical phase drift between the addressing beams have been developed. Various modulated pulse techniques may disentangle any internal qubit state from all collective motional modes. Due to the internal qubit state being disentangled from all collective motional modes, the robustness can be increased inspite of any occurrence of frequency drifts. Such drifts can occur with the motional mode frequencies.

Accordingly, methods have been developed to address individual optical addressing of ions for an MS gate in chain of two or more ions. Such methods include the MEMS addressing system. Further, methods using the PM gates, AM gates, and FM gates have been used to attempt to disentangle internal qubit states from all collective motional modes, wherein the frequency drift can cause the unwanted entanglement. Such methods have been used for ion chains of five ions or more.

Nevertheless, demonstrating high-fidelity two qubit gates in a two-ion chain and four-ion chain need to be demonstrated. A system in which effectively addresses the drift of the motional mode frequencies that leads to entanglement and the amplitude error should be addressed.

In large-scale trapped atomic ion quantum computer, high-fidelity two-qubit gates need to be extended over all qubits with individual control. High-fidelity two-qubit gates in a system of two-ion chains and four-ion chains using radial modes need to be characterized and realized. The gate fidelity in the two-ion chain and the four-ion chain need to be deduced. An appropriate sequence of qubit gates needs to be measured. Methods need to be developed to further improve the gate fidelity toward values that are compatible with fault-tolerant quantum computation.

Accordingly, a need exists to produce a pulse sequence that is free of unwanted spin motion and entanglement caused by a drift in motional mode frequencies. Further, amplitude error that is caused by a phase deviation or amplitude error needs to be corrected more precisely. As such, a method should in place to produce a pulse sequence while accounting for a drift in motional mode frequencies that leads to unwanted entanglement of spins and motions of radial motional modes and a deviation of a rotation angle of the gate that leads to amplitude error.

SUMMARY

Embodiments of the present disclosure employ a process for producing a discrete frequency modulation pulse sequence of symmetric segments given measured mode radial frequencies and a desired gate time.

For high-fidelity quantum logic gate operations, the loss of optical phase coherence between individual addressing beams and the crosstalk from an addressing beam to neighboring qubits can impact the gate fidelity. Gate schemes that are not sensitive to optical phase drift between the addressing beams have been developed to overcome the fluctuation in optical beam paths among different beams.

Modulated pulse techniques are used to disentangle internal qubit gates from collective motional modes and also increase the robustness against frequency drifts. A discrete frequency modulation pulse sequence can be generated by closing phase-space trajectories of all radial motional modes and disentangles the spins and motions of the radial motional modes. Amplitude error due to the deviation of the rotation angle of the gate can be corrected by intentional offset detuning in place of tuning the laser intensity.

An illustrative embodiment of the present disclosure is a system comprising a controller configured to reconstitute a continuous waveform to a discrete analogue version. The system also includes a numerical optimizer configured to determine frequencies of a pulse sequence for the discrete analogue version, wherein the numerical optimizer uses radial motional mode frequencies, and a desired gate time. The numerical optimizer generates the pulse sequence by closing phase-space trajectories for the radial motional modes, disentangles spins and motion, and constrains a Rabi frequency for motional sideband transitions. The system also includes a display configured to illustrate a discrete frequency modulation pulse sequence based on the determined frequencies. The discrete frequency modulation pulse sequence is designed to be a sequence of equal-time segments, wherein each of the equal-time segments has a constant frequency.

In some embodiments, the desired gate time is less than or equal to two hundred microseconds.

In some embodiments, the numerical optimizer is configured to correct a drift of the radial motional modes that leads to spin-motion entanglement and deviation from a geometric phase.

In some embodiments, the numerical optimizer is configured to correct any phase deviation that results in amplitude error.

In some embodiments, a field-programmable gate array is configured to trigger frequency updates for direct digital synthesizer (DDS) channels in real-time.

An embodiment of the present disclosure is a system a controller is configured to obtain a predetermined gate time and measured mode frequencies. The system also includes a numerical optimizer configured to receive the predetermined date time and measured mode frequencies to determine frequencies for a pulse sequence. The numerical optimizer eliminates phase-space trajectories including drift of motional mode frequencies that cause spin-motion entanglement and deviation of a geometric phrase, and wherein the numerical optimizer constrains a Rabi frequency of motional sideband transitions. The system also includes a display device configured to illustrate the pulse sequence based on the predetermined gate time, measured mode frequencies, and the frequencies determined by eliminating the spin-motion entanglement and deviation from the geometric phase.

In some embodiments, the numerical optimizer calculates the frequencies for the pulse sequence to enable the pulse sequence to have equal-time segments.

In some embodiments, wherein the numerical optimizer closes the phase-space trajectory of all radial motional modes.

In some embodiments, the numerical optimizer disentangles the spins and motion of at least four motional modes.

In some embodiments, the numerical optimizer eliminates all amplitude error to enable the pulse sequence to be produced with equal time segments.

Another embodiment of the present disclosure is a method comprising reconstituting a continuous waveform to a discrete analogue version by a controller. The method also includes determining frequencies of a pulse sequence for the discrete analogue version by a numerical optimizer, wherein the numerical optimizer uses radial motional mode frequencies, and a desired gate time. The numerical optimizer generates the pulse sequence by closing phase-space trajectories for the radial motional modes, and wherein the numerical optimizer disentangles spins and motion, and constrains a Rabi frequency for motional sideband transitions. The method also includes illustrating by a display a discrete frequency modulation pulse sequence based on the determined frequencies, wherein the discrete frequency modulation pulse sequence is designed to be a sequence of equal-time segments, wherein each of the equal-time segments have a constant frequency.

In some of the embodiments, gross gate error of a plurality of concatenated Molmer-Sorensen gates is estimated.

In some of the embodiments, a final-state fidelity of consecutive gates, wherein the estimation considers residual spin-motion entanglement is estimated.

In some of the embodiments, a final-state fidelity of consecutive gates with a deviation of Rabi frequency for a motional sideband transition is estimated.

In some of the embodiments, one or more sets of microelectromechanical system (MEMS) mirrors are configured to deliver beams modified by a direct digital synthesizer (DDS).

DETAILED DESCRIPTION

The following disclosure can be performed on an arbitrary waveform generator (AWG), or on a direct digital synthesizer (DDS). Figure (FIG. 1 described below is not intended to limit the disclosure to a specific apparatus such as an arbitrary waveform generator or a DDS.

Figure 1:
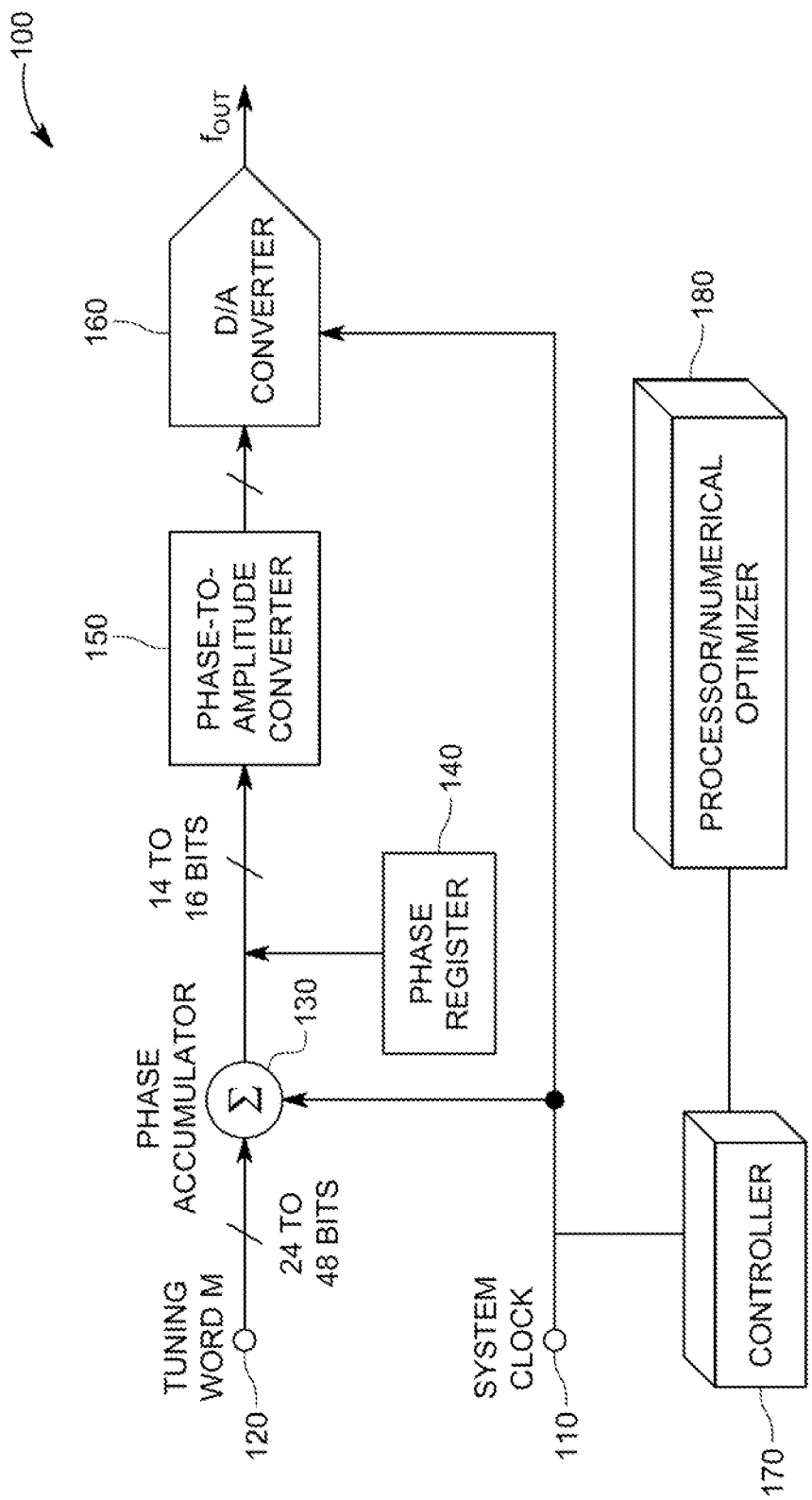
FIG. 1 depicts a block diagram of a direct digital synthesizer in accordance with an illustrative embodiment of the present disclosure.

FIG. 1 depicts a block diagram of a DDS 100. DDS 100 includes a system clock 110, tuning word 120, and phase accumulator 130. In addition, DDS 100 includes a phase register 140. DDS 100 also includes a phase-to-amplitude converter 150 and a digital-to-analog D/A converter 160. Further, the DDS 100 includes a controller 170 and numerical optimizer 180. The controller 170 can reconstitute a continuous waveform into its discrete analogue version that is compatible with the DDS 100. In other embodiments, other components of the DDS 100 can also reconstitute the continuous waveform into its discrete analogue version compatible with the DDS 100. In addition, as will be described below in later figures, such as FIG. 2, the numerical optimizer 180 performs a series of steps to enable a frequency pulse modulation sequence to be displayed. The numerical optimizer 180 can close the phase-space trajectories of all radial motional modes that are involved. The numerical optimizer 180 can also disentangle unwanted spins and motions of the radial motional modes. The frequency drift of the radial motional modes can lead to the unwanted spins and motions of the radial motional modes. The detuning error that arises from a drift of the motional mode frequencies leads to a phased deviation of a rotation angle of a frequency-modulated (FM) gate. The phase deviation of the FM gate is considered amplitude error. The numerical optimizer can compensate for the amplitude error more precisely by using intentional detuning offset in place of tuning the laser intensity.

Figure 2:
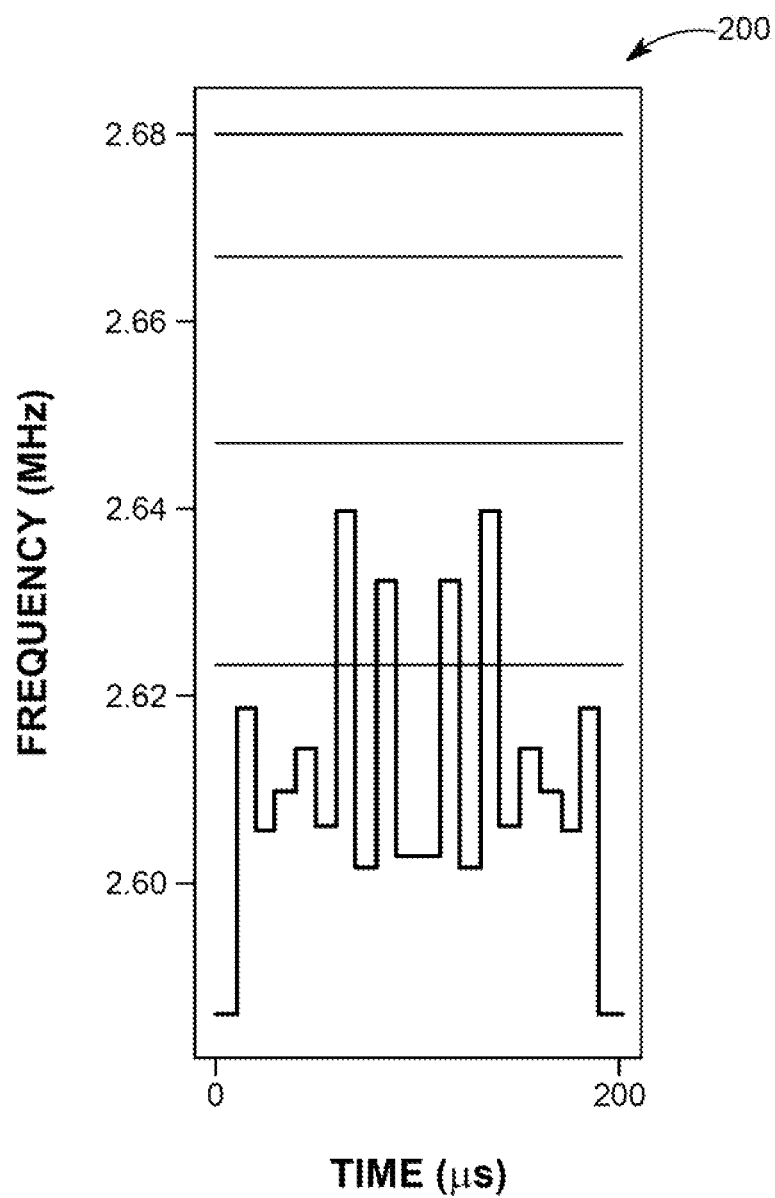
FIG. 2 depicts a display of a discrete frequency modulation pulse sequence in accordance with an illustrative embodiment of the present disclosure.
Figure 3A:
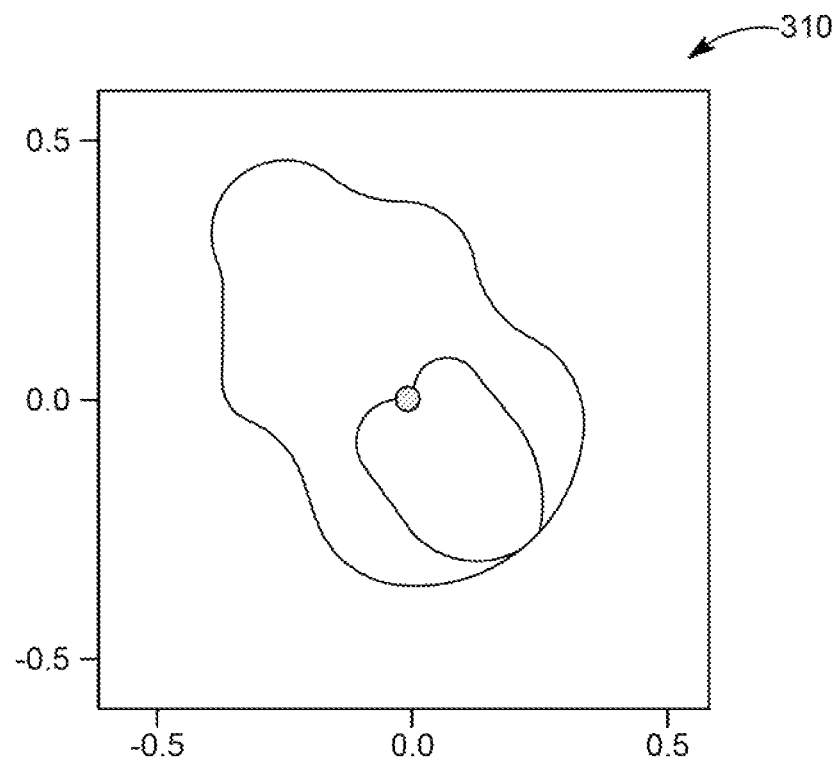
FIG. 3(A) illustrates a phase-space trajectory of a motional mode with an illustrative embodiment of the disclosure.
Figure 3B:
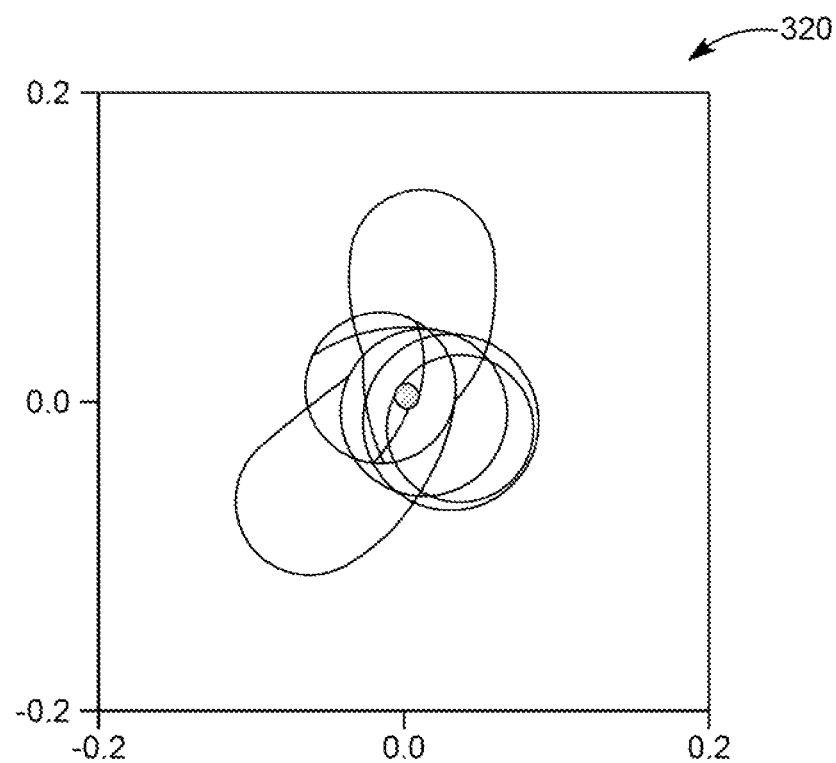
FIG. 3(B) shows another phase-space trajectory of a motional mode with an illustrative embodiment of the disclosure.
Figure 3C:
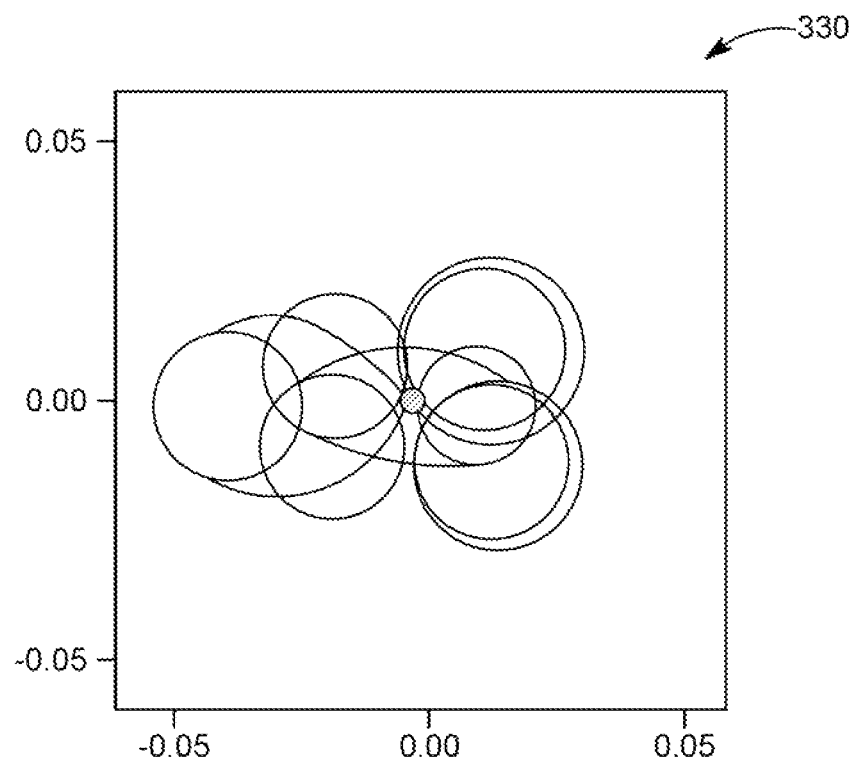
FIG. 3(C) also depicts a phase-space trajectory of a motional mode with an illustrative embodiment of the disclosure.
Figure 3D:
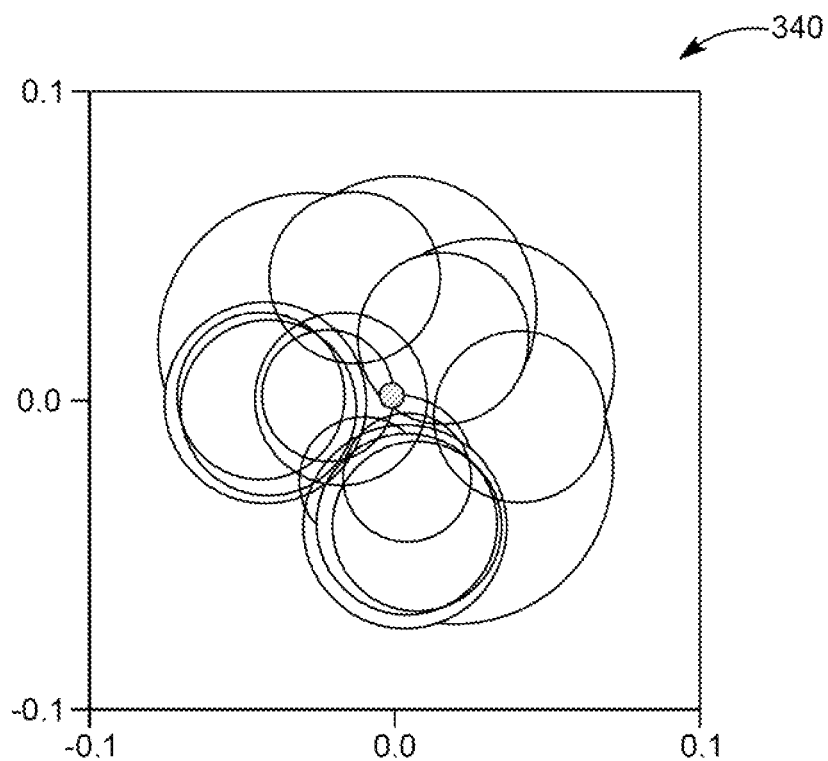
FIG. 3(D) depicts another phase-space trajectory of a motional mode with an illustrative embodiment of the disclosure.

Referring to FIG. 2, a frequency pulse modulation sequence (pulse sequence) 200 is illustrated in which a continuous waveform is reconstituted to a discrete analogue version. Moreover, the pulse sequence 200 is designed to be a sequence of equal-time segments. Each of the time segments can have a constant frequency. Numerical optimizer 180 can enable the pulse sequence 200 to be produced as the output of the DDS 100 by performing a series of steps to eliminate the amplitude error at the FM gate using intentional detuning offset.

In FIG. 2, the numerical optimizer 180 can determine the frequencies of the pulse sequence 200. The numerical optimizer and utilize measured radial motional mode frequencies and desired gate time. In the present embodiment, the desired gate time is shown to be two hundred microseconds. In other embodiments, the desired gate time can be different. Moreover, the gate time refers to a preset period that the numerical optimizer 180 can preset to determine the frequencies of the pulse sequence 200. The desired gate time can be any time less than or equal to 200 microseconds. The numerical optimizer 180 can close the phase-space trajectories of all radial motional modes. In addition, the numerical optimizer 180 can disentangle the unwanted spins and motion of the radial motional modes.

With respect to FIG. 2, detuning error arises from a drift of motional mode frequencies. The drift of motional mode frequencies also leads to the unwanted spin-motion entanglement. The detuning error that arises from the drift of motional mode frequencies can also lead to a deviation of a geometric phase for a Molmer-Sorensen (MS) evolution. As mentioned above, the accumulated phase deviation can refer to a deviation of a rotation angle of the FM gate. As such, the deviation of the rotation angle of the FM gate can be considered amplitude error. One way to correct amplitude error is by tuning the laser intensity. To obtain the pulse sequence 200, the numerical optimizer 180 has to eliminate the amplitude error. In other embodiments, amplitude errors are corrected by tuning the laser intensity. However, in those embodiments, by tuning the laser intensity, if the detuning error were to change on timescales faster than the time between calibration and the experimental circuit, then the intensity calibration will no longer be accurate, and the tuning of the laser intensity will not suffice.

In FIG. 2, intentional detuning offset can be applied to more precisely compensate for small amplitude error as opposed to tuning the laser intensity. The residual spin-motion entanglement and a deviation of the rotation angle of the FM gate can be used with intentional detuning offset. The intentional detuning offset can take advantage of negligible residual spin-motion entanglement against any detuning errors in FM gates. The intentional detuning offset is more precise than tuning the laser intensity. In an embodiment, the calibration can be done by scanning the detuning offset with twenty-one concatenated gates, wherein concatenated refers gates that are closely linked in a chain or series or consecutively. The calibration can be applied to the state |00>. Accordingly, the detuning at which the states |00> and |11> have equal probability will indicate the perfect rotation angle for the MS gate. In an embodiment, and as an example, the intentional detuning offset is applied for up to twenty-one consecutive MS gates, wherein amplitude error is corrected. In other embodiments, the intentional detuning offset can be applied to more or less than twenty-one consecutive MS gates. In place of tuning the laser intensity, the intentional detuning offset can eliminate the amplitude error caused by a deviation of the rotation angle of the gate.

In FIG. 2, the numerical optimizer 180 can correct the detuning error that arises from the drift of motional mode frequencies that leads to unwanted spin-motion entanglement and a deviation of the geometric phase of the radial motional modes. In place of tuning the laser intensity, an intentional detuning offset can be used that can more precisely compensate for the small amplitude error that occurs as a result of a drift of the motional mode frequencies.

In summary, FIG. 2 shows how the numerical optimizer 180 can generate the pulse sequence 200 based on a determined gate time and measured radial motional mode frequencies. The numerical optimizer can close the phase-space trajectories of the radial motional modes, and disentangle the spins and motions of the radial motional modes that occur due to the drift of the motional mode frequencies. The numerical optimizer 180 can also eliminate the deviation of the geometric phase of the MS evolution. The phase deviation can be considered to be a deviation of the rotation angle of the FM gate, or an amplitude error. The intentional detuning offset can be used in place of tuning the laser intensity to more precisely compensate for the amplitude error.

FIGS. 3(A)-(D) illustrate phase-space trajectory of four radial motional modes 310, 320, 330, and 340. As described in FIG. 2, the spins and motions of the radial motional modes need to be entangled to produce the pulse sequence 200 described above in FIG. 2. The numerical optimizer 180 generates the pulse sequence 200 that closes the phase-space trajectories of the radial motional modes 310, 320, 330, and 340. In addition, the numerical optimizer 180 disentangles the spins and motion of the radial motional modes 310, 320, 330, and 340. The amplitude error is compensated by the intentional detuning offset. The numerical optimizer 180 uses the intentional detuning offset to precisely compensate for the phase drift or drift in the motional mode frequencies that causes the unwanted spins and motion and deviation of the geometric phase. The intentional detuning offset compensates for the phase drift of the motional mode frequencies. As a result, the numerical optimizer 180 can close the phase-space trajectories of the radial motional modes 310, 320, 330, and 340, and also disentangle the unwanted spins and motions of the radial motional modes 310, 320, 330, and 340. Accordingly, the pulse sequence 200 can be produced as an output of the DDS 100.

In FIGS. 3(A)-(D), the drift in the motional mode frequencies will lead to unwanted spin-motion entanglement for the radial motional modes 310, 320, 330, and 340. The drift in the motional mode frequencies for the radial motional modes 310, 320, 330, and 340 also leads to a deviation of the geometric phase for the MS evolution. Moreover, the error from residual entanglement of the radial motional modes 310, 320, 330, and 340 can be made negligible over ±1 kHz detuning error in the FM Gate. The phase deviation or deviation of the geometric phase is represented by a deviation of the rotation angle of the FM gate. The deviation of the rotation angle of the FM gate can be determined to be an amplitude error. The amplitude error of the FM gate can be corrected by using intentional detuning offset to precisely compensate for the amplitude error. With tuning the laser intensity, if the detuning error were to change on timescales faster than the time between calibration and the experimental circuit, then the intensity calibration will no longer be accurate. As such, the intentional detuning offset is preferred in place of tuning the laser intensity.

In FIGS. 3(A)-(D), the intentional detuning offset can correct the amplitude error of the FM gate. The intentional detuning offset can be applied to consecutive gates. Moreover, the detuning offset can be scanned with up to twenty-one concatenated gates. As a result, the corresponding calibration can greatly reduce and/or eliminate the amplitude error caused by the deviation of the rotation angle due to the drift in the motional mode frequencies. In addition, the unwanted spin-motion entanglement of the radial motional modes 310, 320, 330, and 340 can be corrected as well. As a result, the pulse sequence 200 with equal time segments at a constant frequency can be produced.

Figure 4:
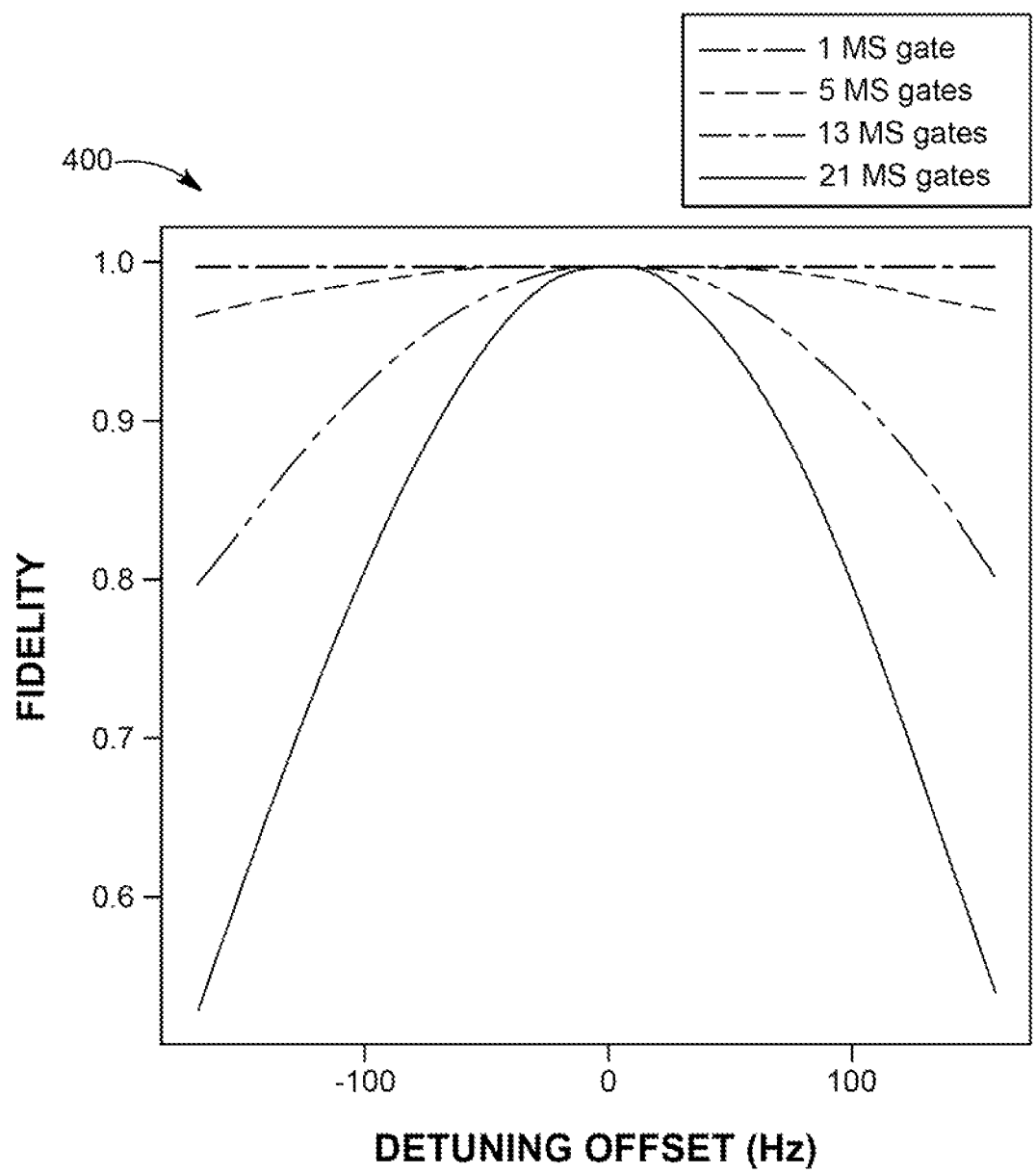
FIG. 4 depicts a graph illustrating the estimated gross gate error of 1, 5, 13, and 21 concatenated gates given different detuning offsets in an illustrative embodiment of the disclosure.

FIG. 4 illustrates a system plot 400 wherein the intentional detuning offset is applied on one MS gate, five MS gates, thirteen MS gates, and twenty-one MS gates. In other embodiments, the intentional detuning offset can be applied to more or less than twenty-one MS gates. Further, the system plot 400 shows an illustration for the intentional detuning offset being applied to the DDS 100 in FIG. 1 to produce the pulse sequence 200 shown in FIG. 2. The estimated gross gate error of one, five, thirteen, and twenty-one concatenated gates with different detuning offsets is illustrated. The estimation of final state fidelity after one, five, thirteen, and twenty-one consecutive MS gates are applied as a function of detuning offset. The estimation of the final-state fidelity applies both the residual spin-motion entanglement of the radial motional modes and the deviation of the rotation angle of the FM gate. The intentional detuning offset can be introduced to take advantage of the negligible spin-motion entanglement against detuning errors in the FM gates. A ±100 Hz detuning offset can compensate for roughly ±0.8% deviation of Rabi frequency for a motional sideband transition. The intentional detuning offset can be used instead of the process of tuning the laser intensity, wherein the intentional detuning offset is a more precise method to obtain the final-state fidelity and to correct any amplitude error of the FM gate.

Figure 5:
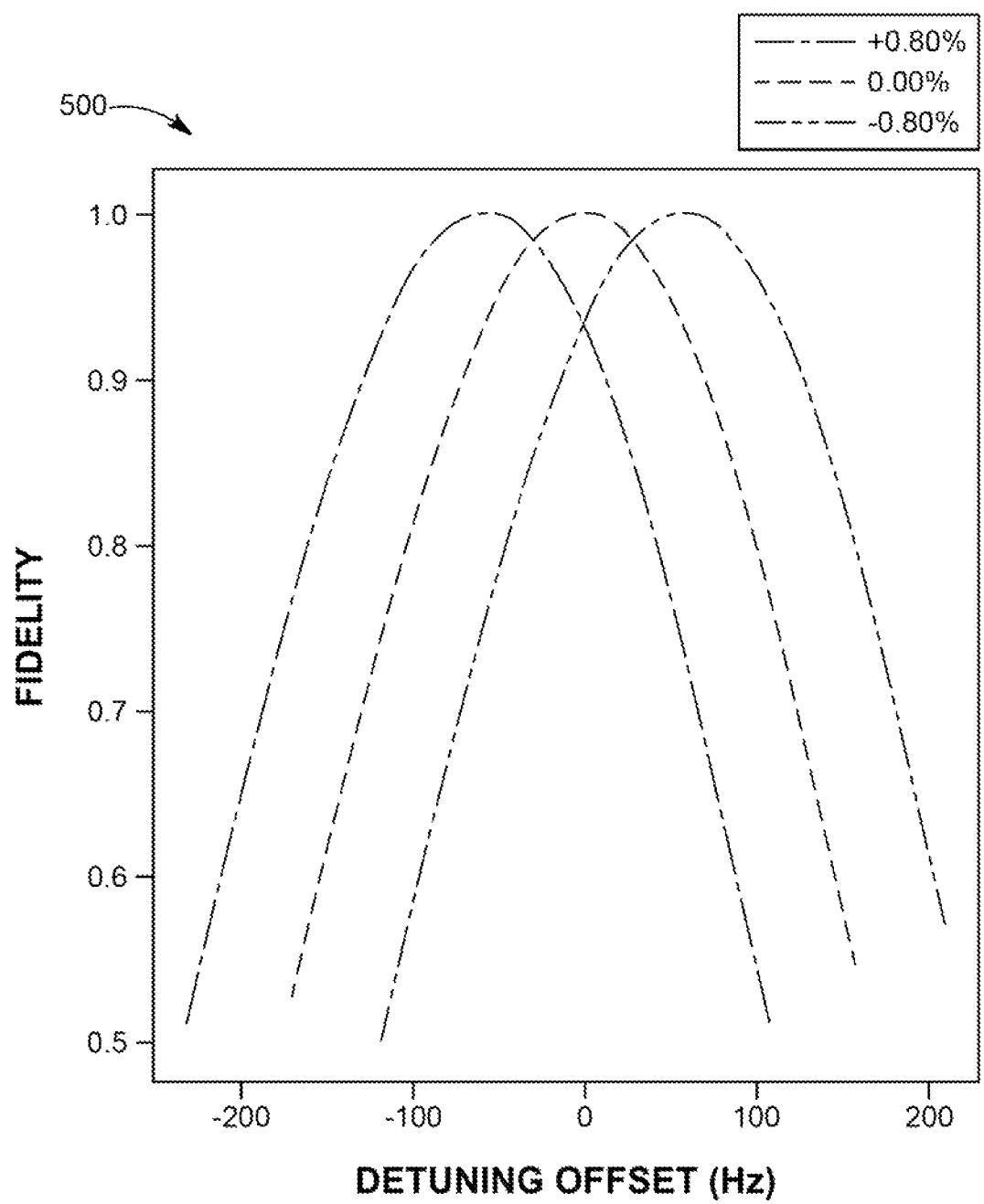
FIG. 5 shows a graph illustrating a final-state error of 21 consecutive gates in an illustrative embodiment of the disclosure.

Referring to FIG. 5, a system plot 500 of the estimated final-state error of twenty-one consecutive MS gates with a ±0.8% deviation of Rabi frequency for the motional sideband transition is illustrated. In other embodiments, the estimated final-state error of more or less than twenty-one consecutive MS gates can be estimated. The system plot 500 shows the final-state error of the twenty-one MS gates within the DDS 100 shown in FIG. 1 to enable the pulse sequence 200 in FIG. 2 to be produced. The amplitude error that occurs due to imperfect laser intensity can be compensated by intentional detuning offset in place of tuning the laser intensity. A ±100 Hz detuning offset can compensate for roughly ±0.8% deviation of Rabi frequency for the motional sideband transition.

In FIG. 5, a calibration is run to compensate for the small drift of the mode frequency and the laser intensity. Further, a small drift of the laser intensity can be compensated more precisely using the intentional detuning offset as opposed to tuning the laser intensity. The calibration can be done by scanning the detuning offset with twenty-one consecutive/concatenated gates that are applied to $|00\rangle$. Moreover, the detuning in which $|00\rangle$ and $|11\rangle$ have equal probability indicates the perfect rotation angle for the MS gate. The present calibration technique thereby improves the gate fidelity as opposed to the rough calibration or tuning the laser intensity.

The two-qubit MS gate can be demonstrated in both two-ion chain and also a four-ion chain. As will be shown below, a state fidelity can be extracted measuring the population and parity contrast. Moreover, the infidelity due to population leakage and the decrease of parity contrast is illustrated.

Figure 6A:
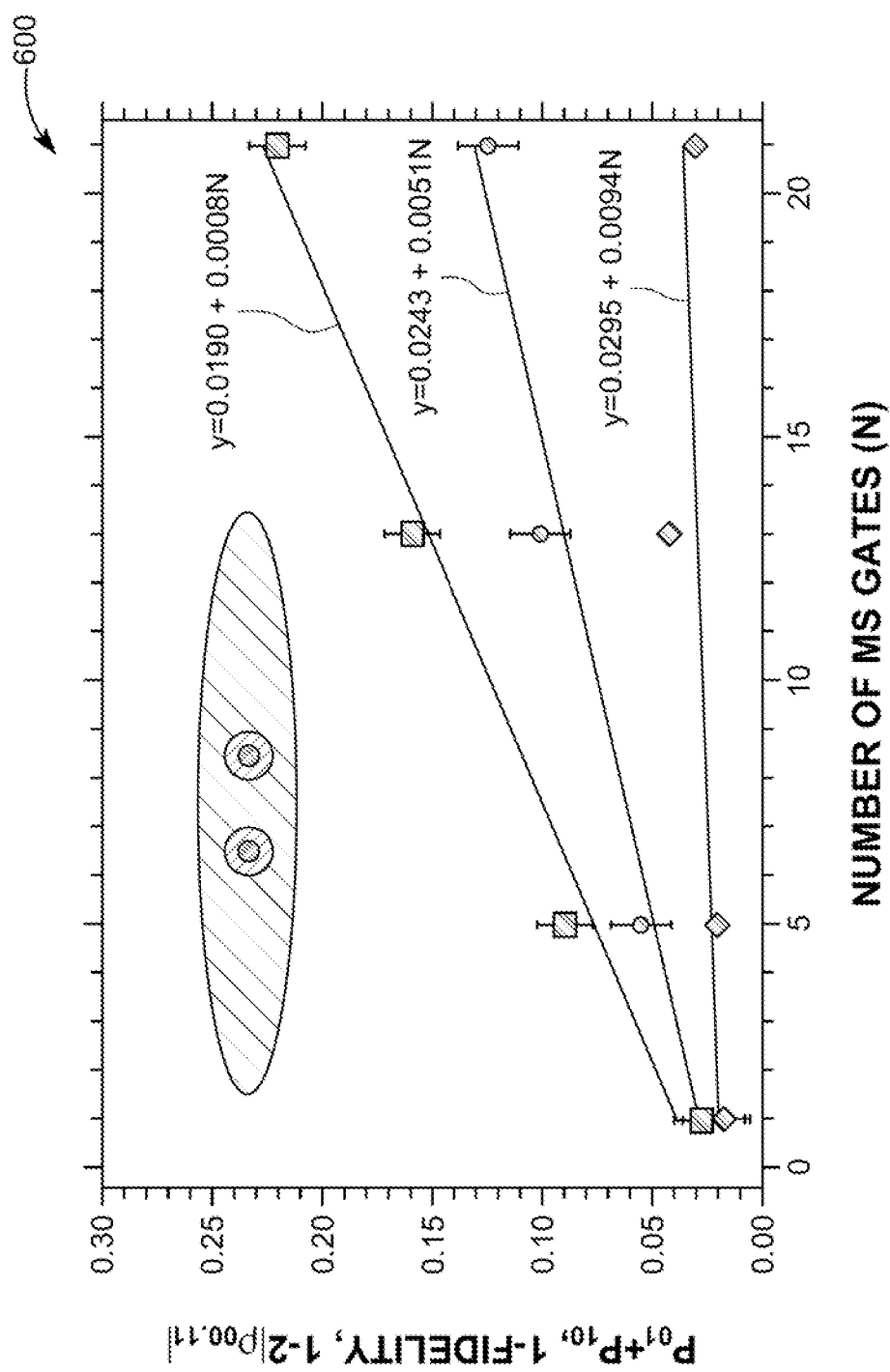
FIG. 6(A) illustrates a gate fidelity in a two-ion chain in an illustrative embodiment of the disclosure.

FIG. 6(A) demonstrates the two-qubit MS gate in a two-ion chain. A plot 600 of the infidelity due to population leakage and the decrease of the parity contrast is illustrated. In FIG. 6(A), the diamonds indicate the population leakage to $|01\rangle$ and $|10\rangle$ space. The squares indicate the loss of parity contrast. Further, the circles indicate the infidelity of the final state. Initially, target qubits are initialized to the $|00\rangle$ state. A sequence of one, five, thirteen, and twenty-one MS gates are applied to make the maximally entangled state $|\psi_+\rangle = (|00\rangle + i|11\rangle)/\sqrt{2}$. The state fidelity can be extracted by measuring the population and the parity contrast. The stochastic and the coherent error can accumulate with the concatenated MS gates in a linear and quadratic way. In addition, a state preparation and measurement (SPAM) error remains constant as well. However using the linear fit/way, the gate or state fidelity can be extracted without the SPAM error. As such, the two-qubit gate fidelity for a two-ion chain is 99.49%. As such, the data matches the linear fit/way, and any systematic error is thereby negligible for the two-qubit gate.

Figure 6B:
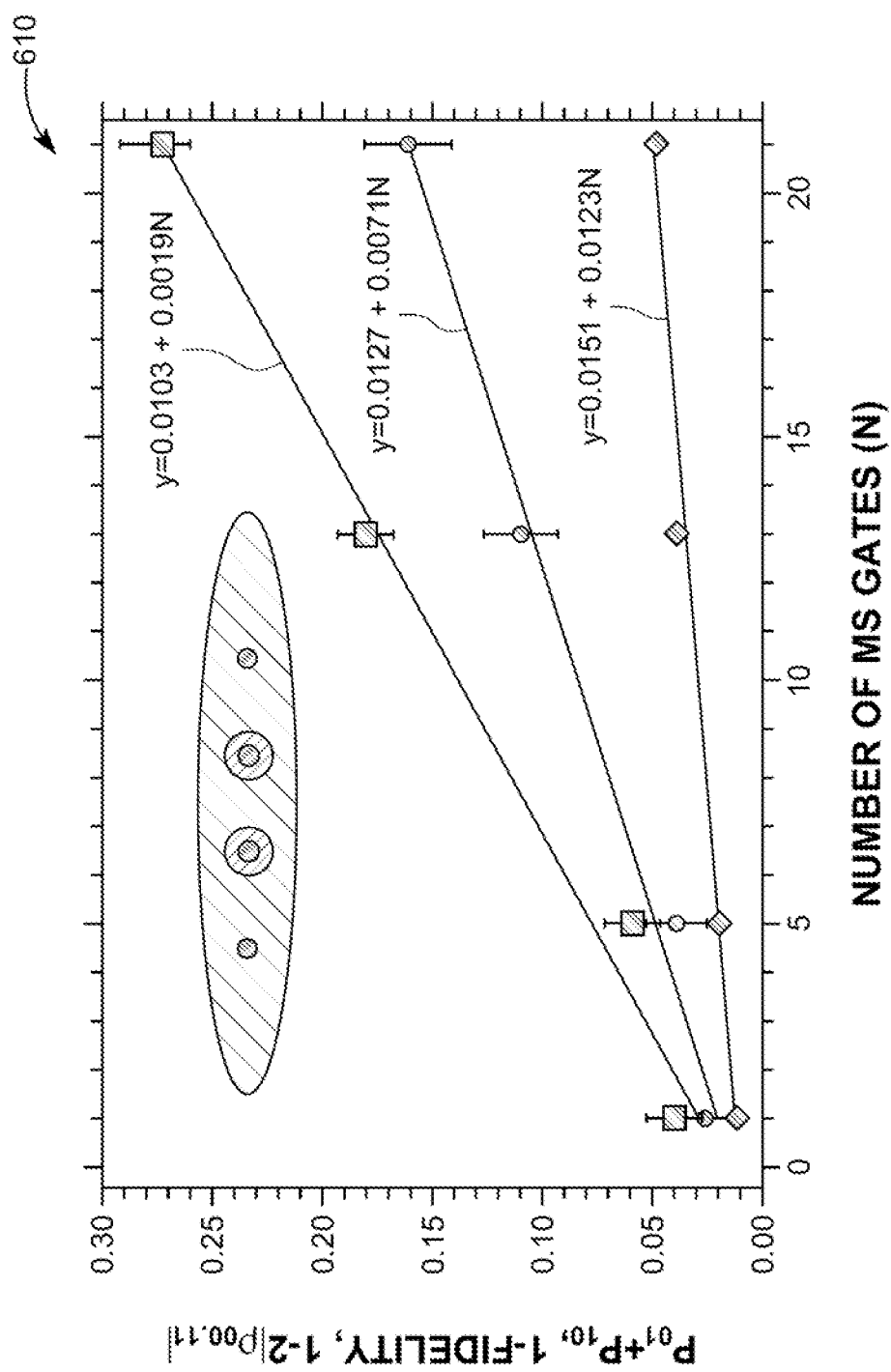
FIG. 6(B) shows a gate fidelity in a four-ion chain in an embodiment of the disclosure.

Referring to FIG. 6(B), a plot 610 of the infidelity due to population leakage and the decrease of parity contrast in a four-ion chain is illustrated. As in FIG. 6(A), the diamonds in the figure indicate the population leakage to a $|01\rangle$ and $|10\rangle$ space. In addition, squares indicate the loss of parity contrast, while the circles indicate the infidelity of the final state. As in the two-chain, in the four-ion chain, the target quits are initialized to the state $|00\rangle$ state. The one, five, thirteen, and twenty-one MS gate sequence is applied to make the maximally entangled state $|\psi_+\rangle = (|00\rangle + i|11\rangle)/\sqrt{2}$.

To extract the state fidelity (as indicated by the circles in FIG. 6(B)), the population and parity contrast need to be measured. The population and parity contrast have to be measured even though the stochastic and coherent error can accumulate within the gates linearly and quadratically. In addition, the SPAM error can remain constant. Nevertheless, using the linear fit as in FIG. 6(A), the gate fidelity can be extracted without the SPAM error. For the four-ion chain, the two-qubit gate fidelity is 99.30%. As the data for the four-ion chain matches a linear fit, any coherent systematic error is negligible as with the two-ion chain. Further, the gate fidelity can therefore be extracted without the SPAM error. Any systemic error is also negligible for the two-qubit gate as the data matches a liner fit.

With respect to FIGS. 6(A)-(B), the simulated error values for the four-ion and two-ion chain for laser dephasing, motional dephasing, Raman bean intensity fluctuation, and off-resonant coupling are the same. In addition, the simulated error values for motional heating, spontaneous emission, and FM Solution imperfection are the same as well.

With an optimized automatic calibration pipeline for a trapped ion system, high-fidelity two-qubit gates in a microelectromechanical system (MEMS) can be demonstrated. The qubit can be encoded in hyperfine levels of the hyperfine levels of the $^2S_{1/2}$ manifold in a $^{171}Yb^+$ ion as $|0\rangle \equiv |F=0; m_F=0\rangle$ and $|1\rangle \equiv |F=1; m_F=0\rangle$ with a qubit frequency splitting of 12.642821 GHZ, as shown in FIG. 7(C). In other embodiments, a similar approach can be used with other atomic species and isotopes.

Figure 7A:
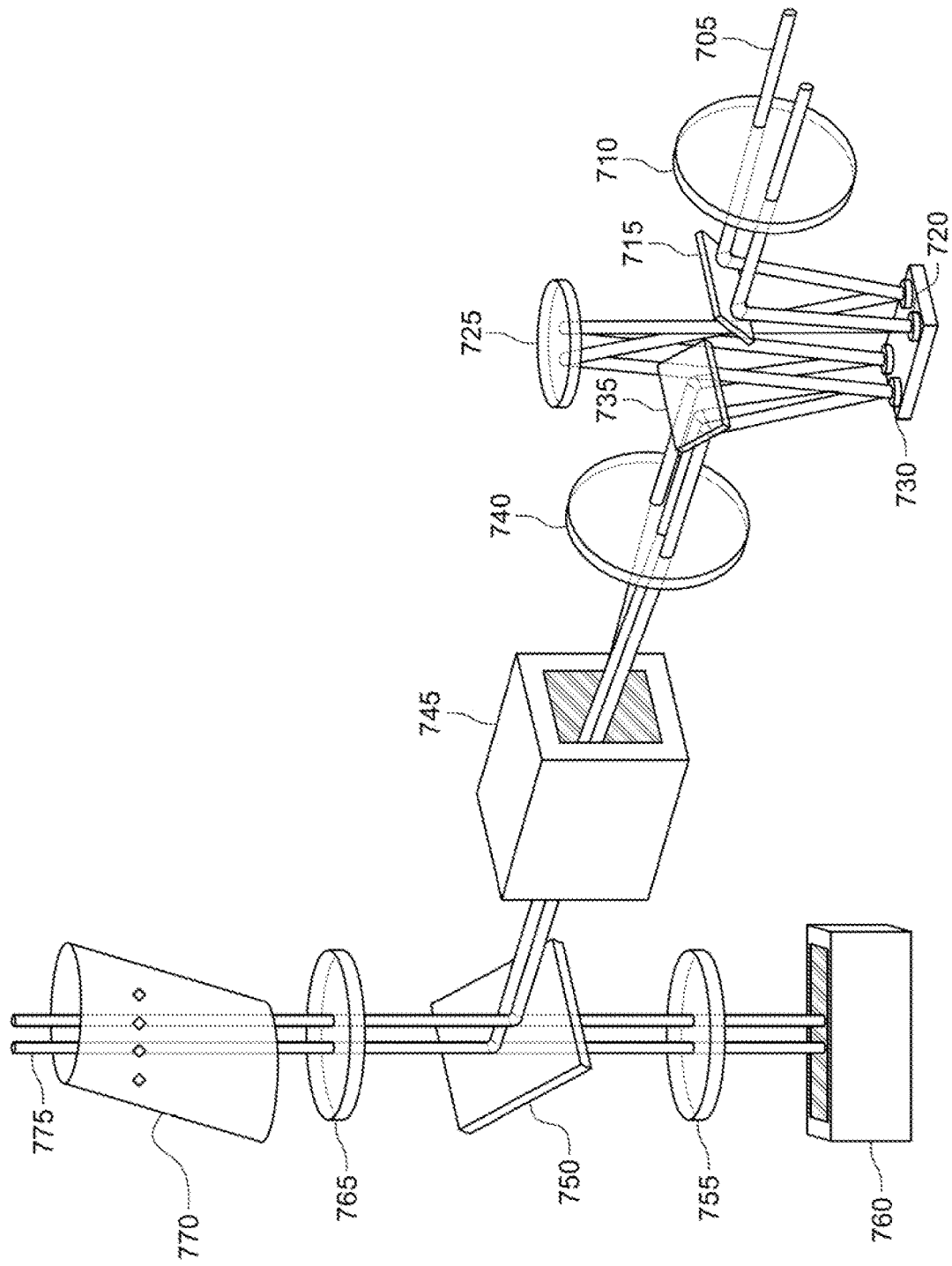
FIG. 7(A) depicts a schematic representation of a Raman beam optical setup in an embodiment of the disclosure.

In FIG. 7(A), the MEMS-based qubit addressing system 700 is illustrated. A first parallel beam (beam) 705 is incident on a focusing lens 710. The first parallel beam 705 is a pair of tightly focused individual addressing beams that can be independently steered across a qubit chain using an MEMS device. The beam 705 passes through the focusing lens 710 and is incident on a first lens 715. The beam 705 thereby passes through the first lens 715 and is incident on a first MEMS mirror 720 within the MEMS device. The first MEMS mirror 720 is part of an MEMS device that also includes a second MEMS mirror 730. After the beam 705 is reflected from the first MEMS mirror 720, the beam 705 is incident on a concave mirror 725. The beam 705 reflects off of the concave mirror 725 and onto the second MEMS mirror 730 within the MEMS device. From the second MEMS mirror 730, the beam 705 then travels onto a second lens 735. From the second lens 735, the beam 705 is reflected onto a Fourier Lens 740. The beam 705 travels through the Fourier plane onto a projection and beam combining optics 745. The beam 705 can then be incident on a Dichroic Mirror 750.

In FIG. 7(A), a fiber array 760 can provide another beam 775 onto another lens or detection optics 755. The beam 775 can also be incident onto the Dichroic Mirror 750 as beam 705. From the Dichroic mirror 750, the beams 705, 775 are incident on a high NA imaging lens 765. The beams 705, 775 pass through the high NA imaging lens 765 onto the qubits 770. Accordingly, the combination of the fiber array 760 and the MEMS mirrors 720, 730 lead to clean Gaussian beams and low intensity crosstalk on the neighboring qubits 770.

Figure 7B:
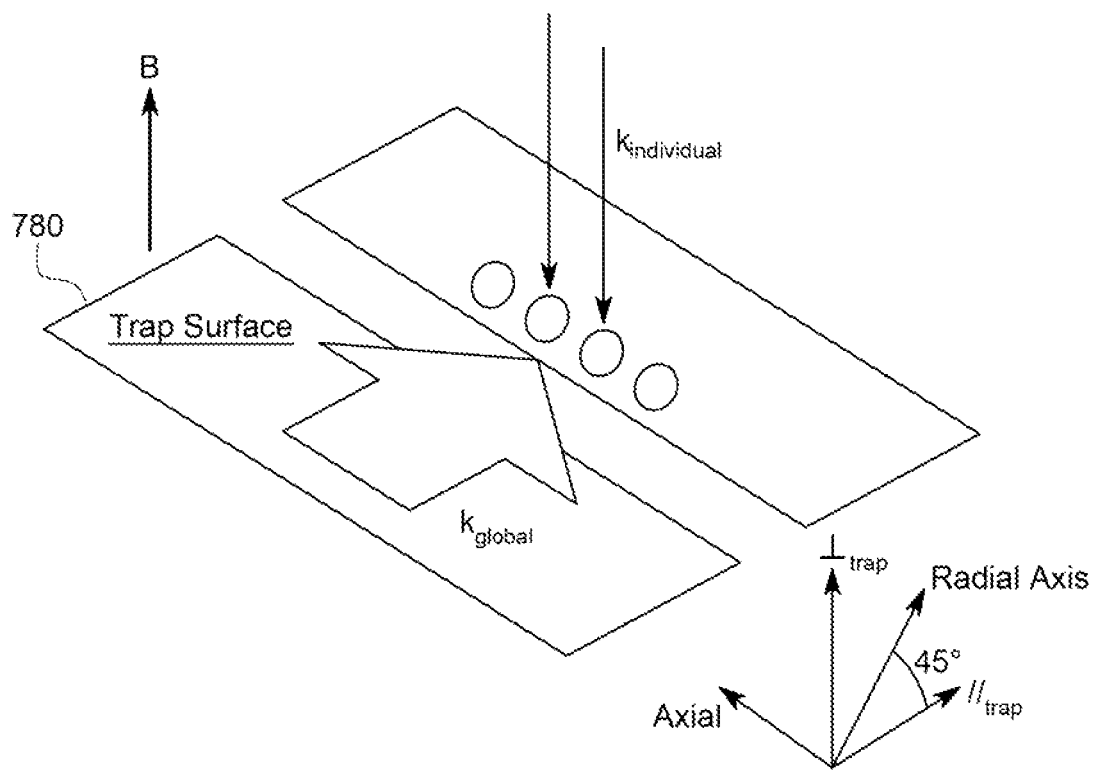
FIG. 7(B) illustrates another schematic representation of a Raman beam optical setup in an embodiment of the disclosure.
Figure 7C:
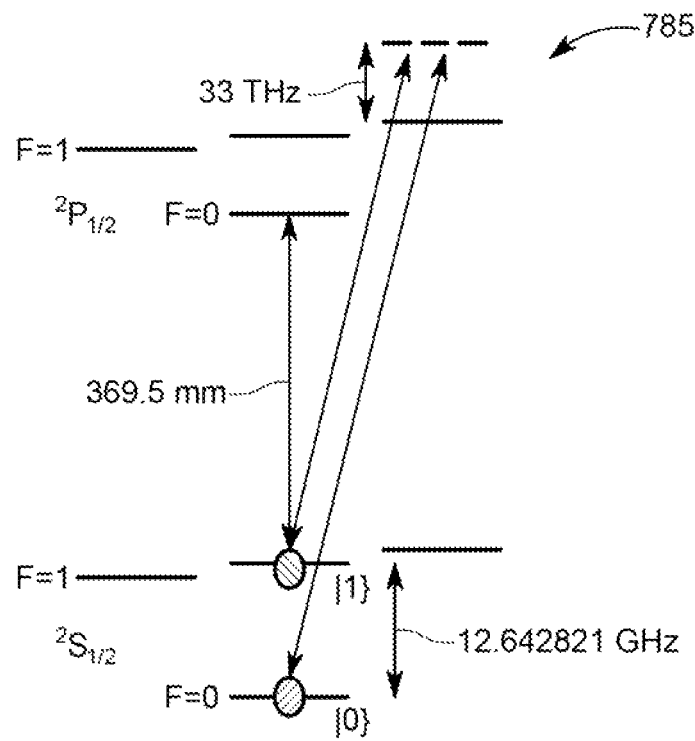
FIG. 7(C) shows an energy level schematic of a $^{171}Yb^+$ ion in an embodiment of the disclosure.

In FIG. 7(B), also illustrates a schematic representation of the Raman beam optical setup. A trap surface 780 is illustrated. The trap axial axis is rotated by forty-five degrees with respect to both tilting axes of the MEMS mirrors 720, 730 to utilize orthogonal tilting mirrors to maximize the addressable qubits. The projection and beam combining optics 745 can be represented by a black box.

FIG. 7(C) illustrates an energy level schematic 785 of a $^{171}Yb^+$ ion. The red and blue lines indicate the two photon Raman transition for qubit operations.

Overall, the optical setup can produce a pair of clean Gaussian Beams and low intensity crosstalk on the neighboring qubits 770. The intensity crosstalk can lead to a gate crosstalk, or a ratio of the Rabi frequency between the target qubit and the neighboring qubit.

Figure 8:
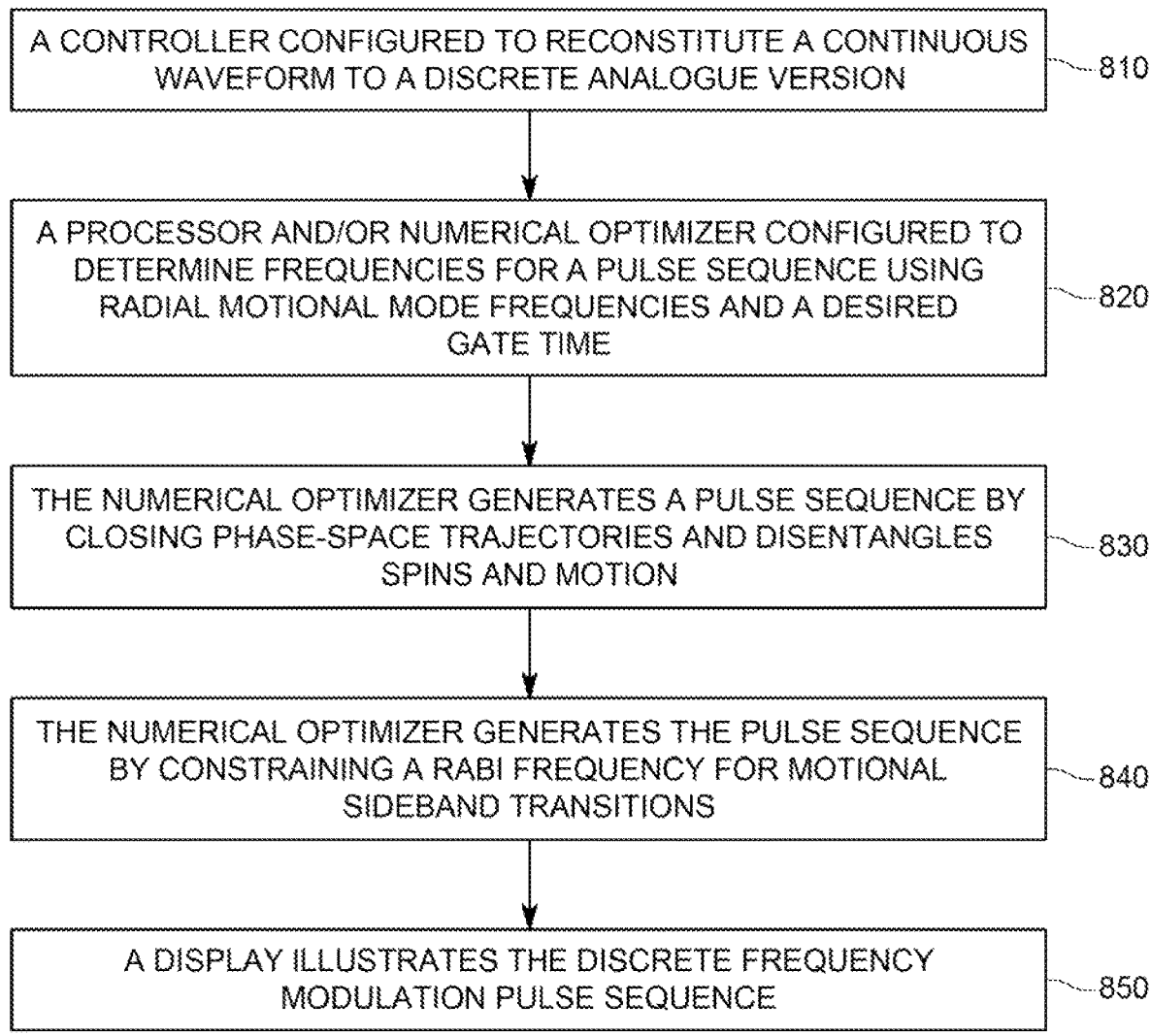
FIG. 8 illustrates a flowchart describing a process in accordance with an embodiment of the disclosure.

FIG. 8 illustrates the process 800 in which the pulse modulation sequence can be produced. The numerical optimizer 180 can enable the pulse sequence 200 using measured radial mode frequencies and a desired gate time of up to two hundred microseconds. The desired gate time can be less than or equal to two hundred microseconds. The numerical optimizer 180 can disentangle the unwanted spins and motions of the radial motional modes shown in FIGS. 3(A)-(D) caused by the drift in the motional mode frequencies. In addition, the numerical optimizer 180 also closes the phase-space trajectories of the radial motional modes caused by the drift in the motional mode frequencies. The accumulated phase deviation or deviation of the rotation angle of the gate can be considered amplitude error. Nevertheless, intentional detuning offset can compensate for the amplitude error.

In FIG. 8, at step 810, the controller 180 within the DDS 100 can reconstitute a continuous waveform to its discrete analogue version. In other embodiments, other components of the DDS 100 can reconstitute the continuous waveform to its discrete analogue version.

In FIG. 8, at step 820, the numerical optimizer 180 is configured to determine frequencies for a pulse sequence 200 using radial motional mode frequencies and a desired gate time. The desired gate time can be less than or equal to two hundred microseconds.

In FIG. 8, at step 830, the numerical optimizer 180 generates the pulse sequence 200 by closing phase-space trajectories and disentangling unwanted spins and motions of the radial motional modes. Drift of the motional mode frequencies leads to the unwanted spin-motion entanglement of the motional modes and the phase deviation. The numerical optimizer 180 can disentangle the unwanted spins and motions of the motional modes. In addition, the accumulated phase deviation is represented by a deviation of the rotation angle of the FM gate. The deviation of the rotation angle of the FM gate can be determined to be amplitude error. Intentional detuning offset can be used to precisely compensate for the amplitude error, or the deviation of the rotation angle of the FM gate.

In FIG. 8, at step 840, the numerical optimizer generates the pulse sequence 200 by constraining a Rabi frequency for motional sideband transitions. The numerical optimizer 180 constrains the Rabi frequency of the motional sideband transitions to be less than 7 kHz. Moreover, in an embodiment, the required sideband Rabi frequencies are 5.55 kHz for FM gates in a two-ion chain, and 5.47 kHz for FM gates in a four-ion chain respectively.

Referring to FIG. 8, at step 850, the discrete frequency modulation pulse sequence/pulse sequence 200 is displayed. The pulse sequence 200 is designed to be a sequence of equal time segments, wherein each of the time segments has a constant frequency. The unwanted spins and entanglement, and phase deviation have been eliminated. The pulse sequence can have a total gate time less than or equal to two hundred microseconds, and also consist of twenty symmetric segments.

In summary, the numerical optimizer 180 can enable the pulse sequence 200 to be generated by disentangling the unwanted spins and motions of the radial motional modes caused by the drift in the motional mode frequencies. In addition the accumulated phase deviation of the of the rotation angle of the FM gate caused by the drift of the motional mode frequencies can be compensated for precisely by using intentional detuning offset. The intentional detuning offset can precisely compensate for the small amplitude error due to the deviation of the rotation angle of the FM gate. In an embodiment, a ±100 Hz detuning offset can compensate roughly ±0.8% deviation of Rabi frequency for the motional sideband transition.

It is to be understood that the disclosure teaches just some examples of embodiments in accordance with the present disclosure and that many variations of the disclosure can easily be devised by those skilled in the art after reading this disclosure and that the scope of the present disclosure is to be determined by the following claims.

What is claimed is:

1. A system comprising:
   a controller configured to reconstitute a continuous waveform to a discrete analogue version;
   a processor configured to determine frequencies of a pulse sequence for the discrete analogue version, wherein the processor uses radial motional mode frequencies, and a desired gate time, wherein the processor generates the pulse sequence by closing phase-space trajectories for the radial motional modes, and disentangles spins and motion, and constrains a Rabi frequency for motional sideband transitions, wherein a field-programmable gate array is configured to trigger frequency updates for direct digital synthesizer (DDS) channels in real-time based on the determined frequencies to correct any phase deviation that results in amplitude error; and
   display configured to illustrate a discrete frequency modulation pulse sequence based on the determined frequencies, wherein the discrete frequency modulation pulse sequence is designed to be a sequence of equal-time segments, wherein each of the equal-time segments have a constant frequency.

2. The system of claim 1, wherein the desired gate time is less than or equal to two hundred microseconds.

3. The system of claim 1, wherein processor constrains the Rabi frequency to be less than seven kHz.

4. The system of claim 1, wherein the processor is configured to correct a drift of the radial motional modes that leads to spin-motion entanglement and deviation from a geometric phase.

5. A system comprising:
   a controller is configured to obtain a predetermined gate time and measured mode frequencies;
   a processor configured to receive the predetermined gate time and measured mode frequencies to determine frequencies for a pulse sequence, wherein the processor eliminates phase-space trajectories including drift of motional mode frequencies that cause spin-motion entanglement and deviation of a geometric phrase, and wherein the processor constrains a Rabi frequency of motional sideband transitions, wherein a field-programmable gate array is configured to trigger frequency updates for direct digital synthesizer (DDS) channels in real-time based on the determined frequencies to correct any phase deviation that results in amplitude error; and
   a display device configured to illustrate the pulse sequence based on the predetermined gate time, measured mode frequencies, and the frequencies determined by eliminating the spin-motion entanglement and deviation from the geometric phase.

6. The system of claim 5, wherein the deviation of the geometric phase is for a Molmer-Sorenson (MS) two-qubit gate.

7. The system of claim 5, wherein the processor calculates the frequencies for the pulse sequence to enable the pulse sequence to have equal-time segments.

8. The system of claim 5, wherein the processor closes the phase-space trajectory of all radial motional modes.

9. The system of claim 5, wherein the processor eliminates all amplitude error to enable the pulse sequence to be produced with equal time segments.

10. The system of claim 5, wherein the processor disentangles the spins and motion of at least four motional modes.

11. The system of claim 6, wherein processor determines the deviation of a rotation angle for a two-qubit gate.

12. A method comprising:
    reconstituting a continuous waveform to a discrete analogue version by a controller;
    determining frequencies of a pulse sequence for the discrete analogue version by a processor, wherein the processor uses radial motional mode frequencies, and a desired gate time, wherein the processor generates the pulse sequence by closing phase-space trajectories for the radial motional modes, and wherein the processor disentangles spins and motion, and constrains a Rabi frequency for motional sideband transitions;
    configuring one or more sets of micro-electromechanical system (MEMS) mirrors to deliver beams modified by a direct digital synthesizer (DDS) based on the determined frequencies to correct amplitude error; and
    illustrating by a display a discrete frequency modulation pulse sequence based on the determined frequencies, wherein the discrete frequency modulation pulse sequence is designed to be a sequence of equal-time segments, wherein each of the equal-time segments have a constant frequency.

13. The method of claim 12, further comprising:
    estimating gross gate error of a plurality of concatenated Molmer-Sorensen gates.

14. The method of claim 12, wherein the frequency modulation pulse sequence is generated by closing phase space trajectories of one or more radial motional modes.

15. The method of claim 12, further comprising:
    estimating a final-state fidelity of consecutive gates, wherein the estimation considers residual spin-motion entanglement.

16. The method of claim 12, further comprising:
    estimating a final-state fidelity of consecutive gates with a deviation of the Rabi frequency for the motional sideband transitions.

17. The method of claim 12, further comprising:
    applying intentional detuning offset to compensate for amplitude error due to a laser intensity.

* * * * *